Figure 1:
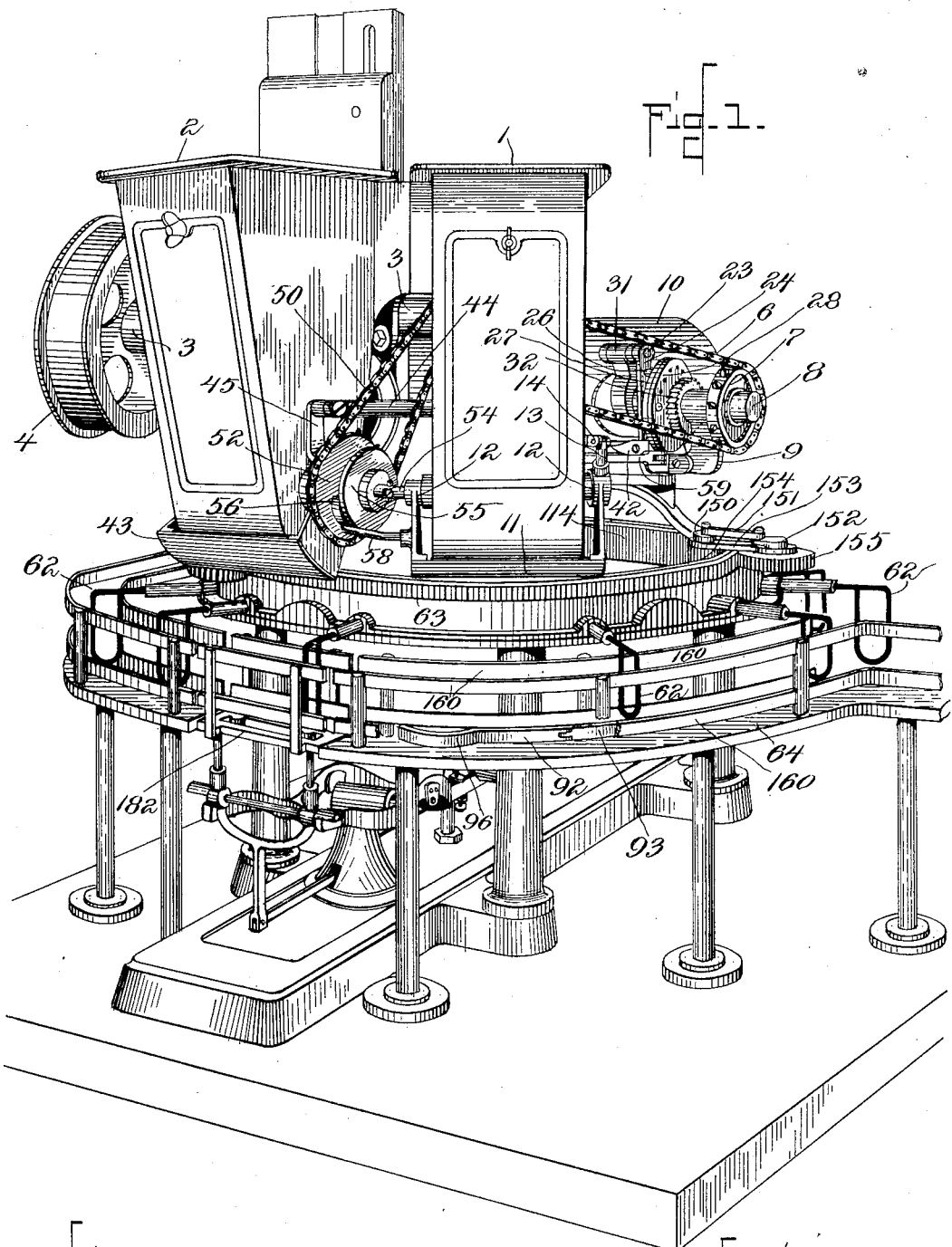

No. 633,675. Patented Sept. 26, 1899.
G. W. WATSON.
WEIGHING AND PACKAGE FILLING MACHINE.
(Application filed Mar. 11, 1898.)
(No Model.) 10 Sheets—Sheet 1.

Witnesses
Robert Wallace.
Oscar F. Hill

Inventor
George W. Watson
by W. A. Copeland
atty.

No. 633,675. Patented Sept. 26, 1899.
G. W. WATSON.
WEIGHING AND PACKAGE FILLING MACHINE.
(Application filed Mar. 11, 1898.)
(No Model.) 10 Sheets—Sheet 2.

Witnesses
Robert Wallace
Oscar F. Hill

Inventor
George W. Watson
by H. A. Copeland
atty.

No. 633,675. Patented Sept. 26, 1899.
G. W. WATSON.
WEIGHING AND PACKAGE FILLING MACHINE.
(Application filed Mar. 11, 1898.)
(No Model.) 10 Sheets—Sheet 3.

Witnesses:
Robert Wallace.
Oscar F. Hill.

Inventor:
George W. Watson
by H. A. Copeland
atty.

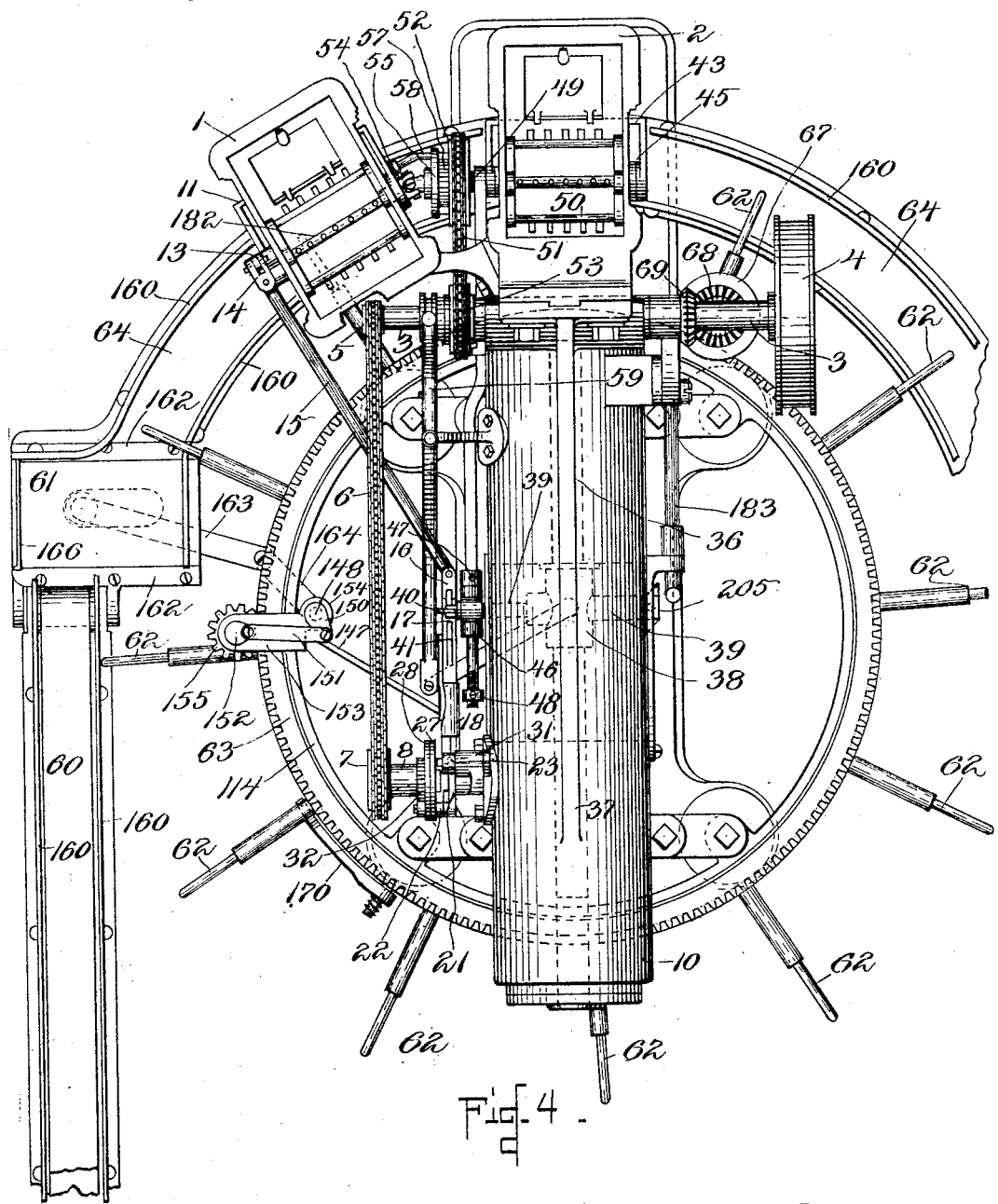

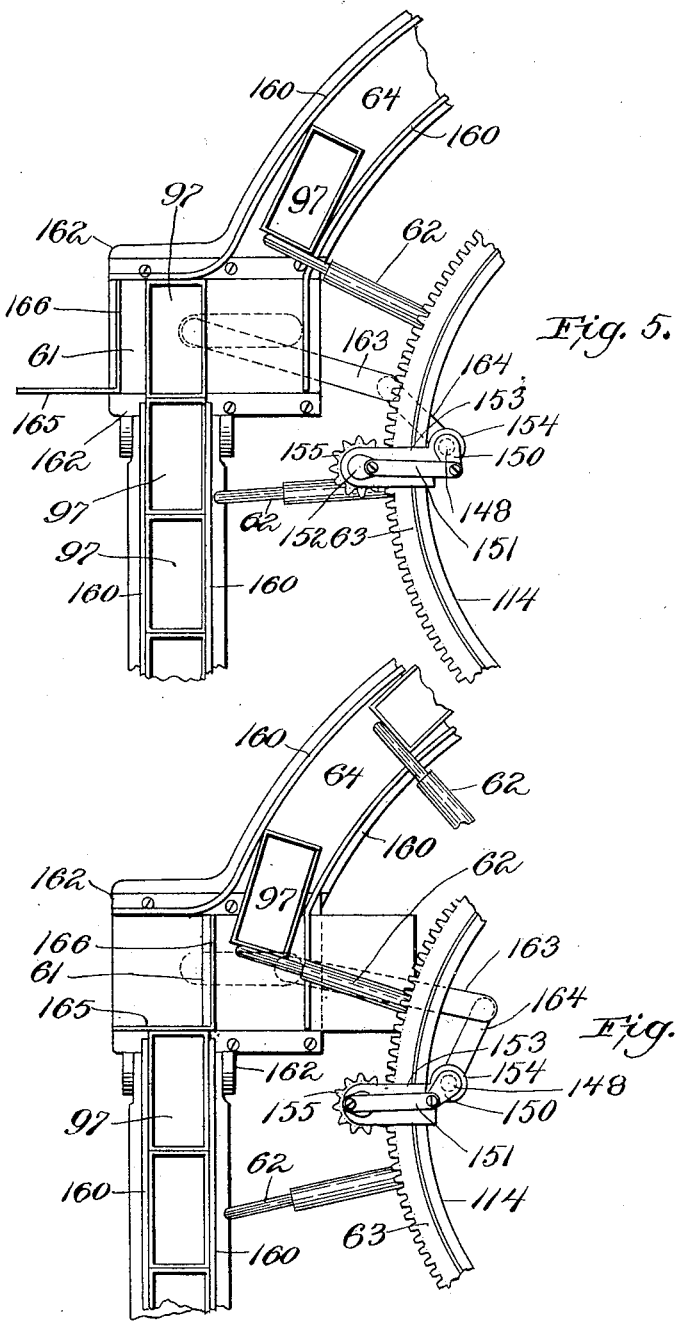

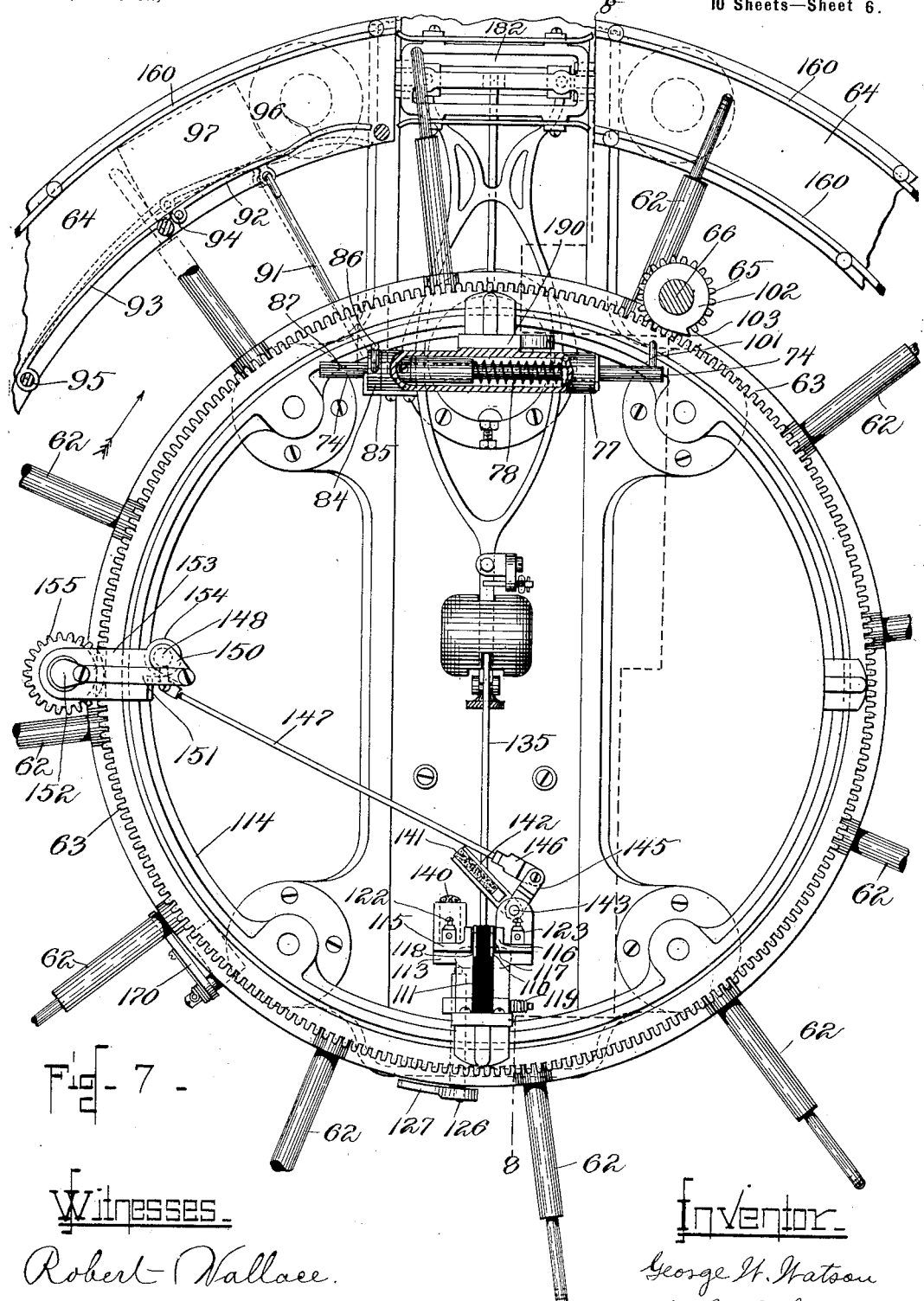

No. 633,675. Patented Sept. 26, 1899.
G. W. WATSON.
WEIGHING AND PACKAGE FILLING MACHINE.
(Application filed Mar. 11, 1898.)
(No Model.) 10 Sheets—Sheet 7.
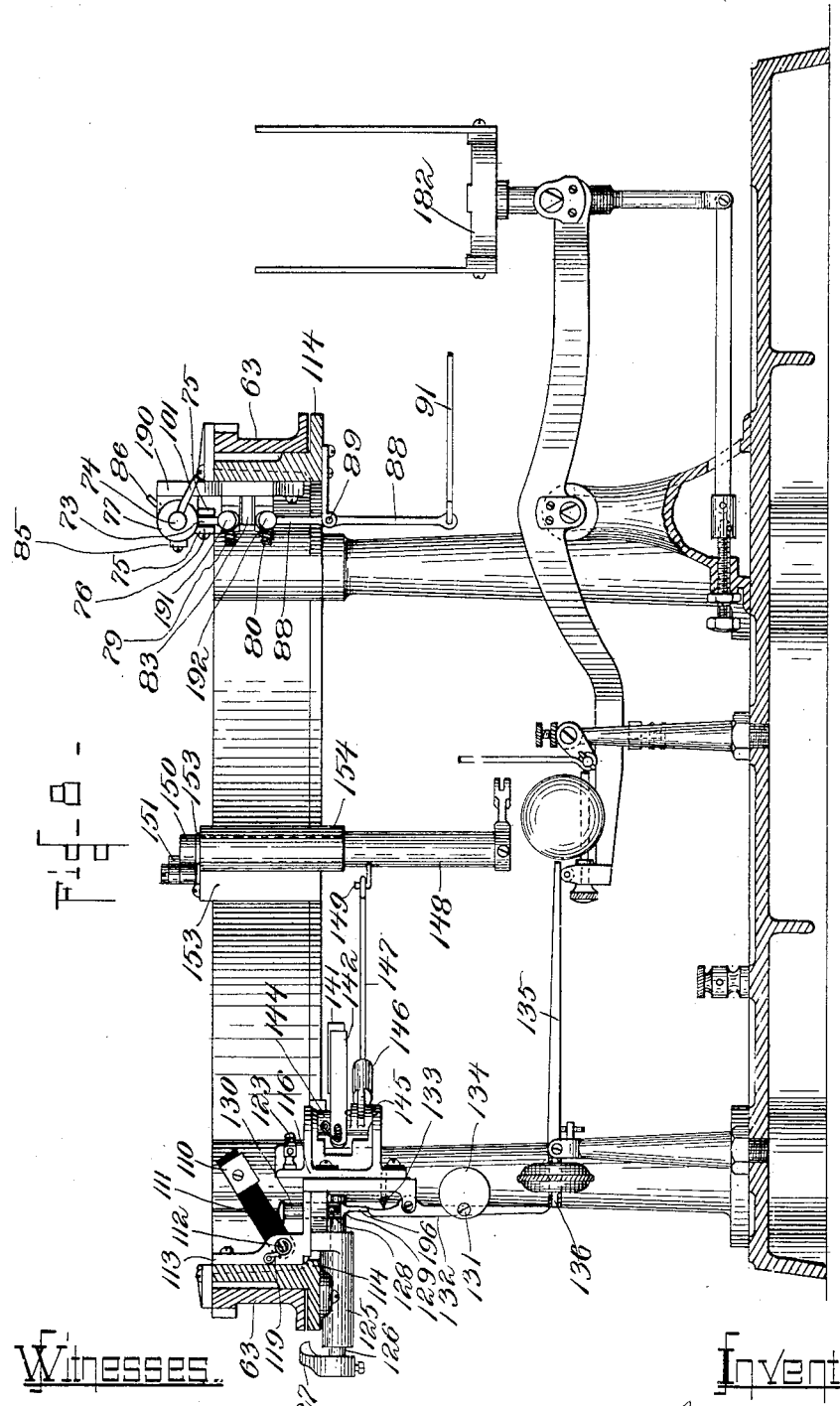
Witnesses.
Robert Wallace.
Oscar F. Hill
Inventor
George W. Watson
by W. A. Copeland.
atty.

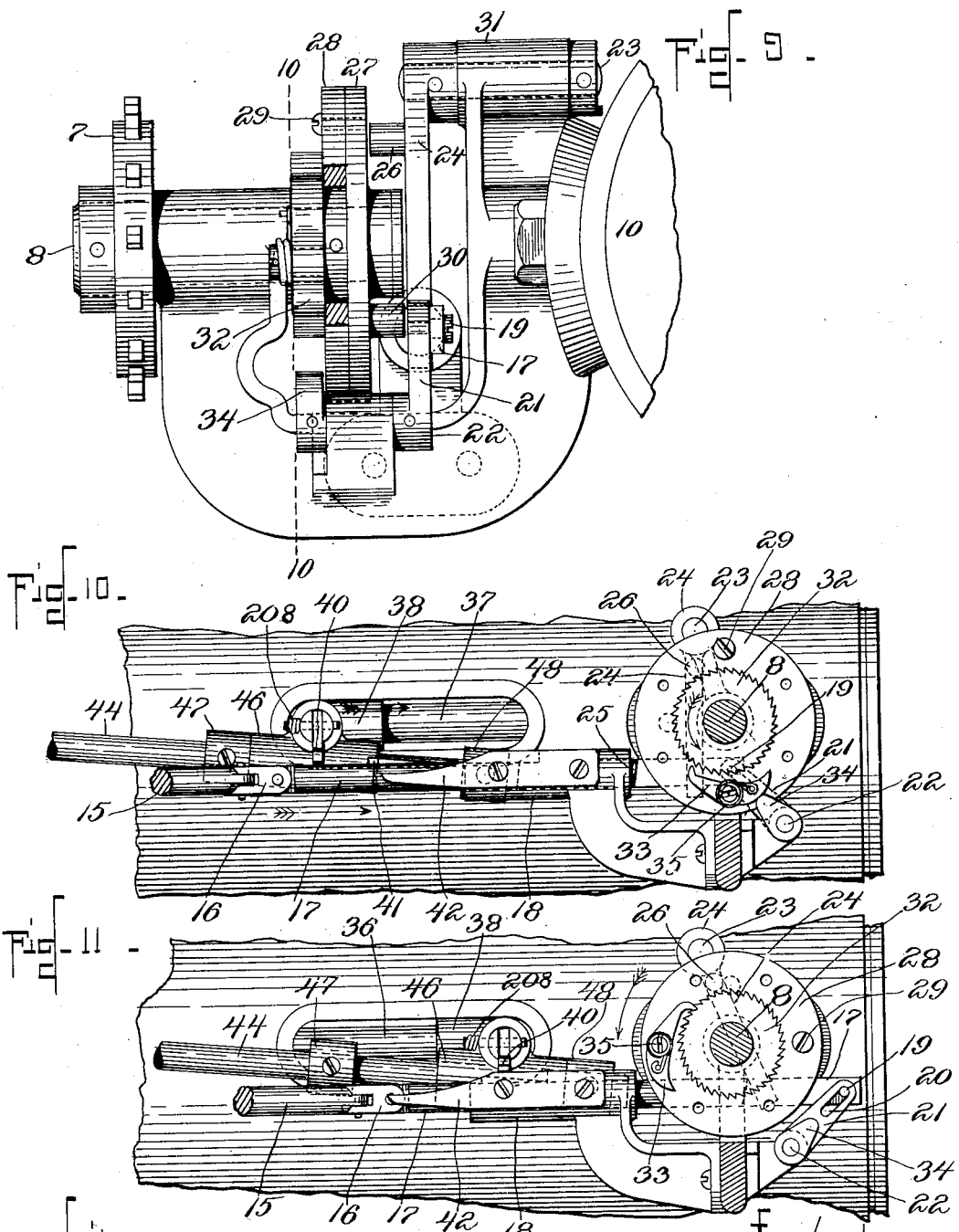

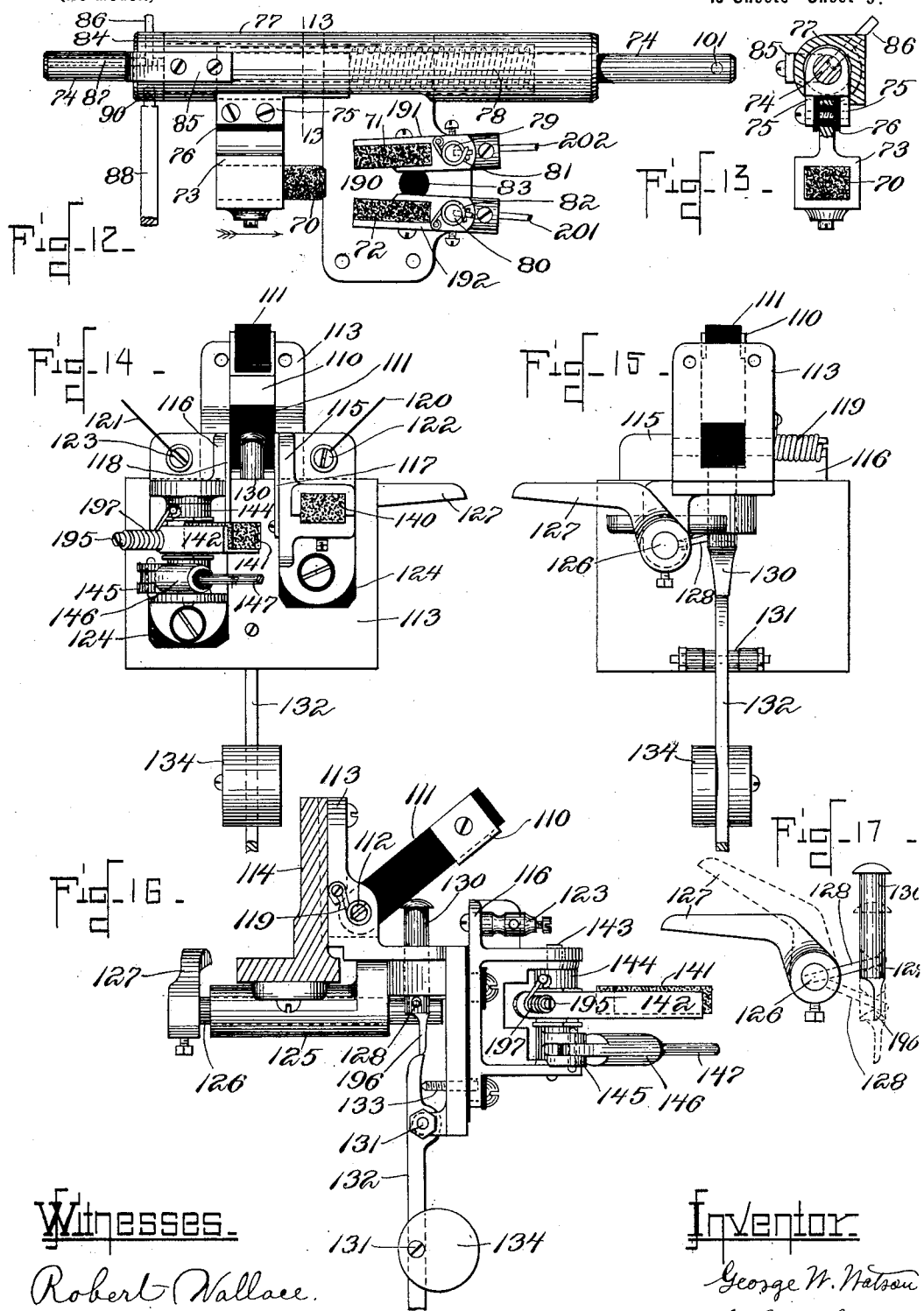

No. 633,675. Patented Sept. 26, 1899.
G. W. WATSON.
WEIGHING AND PACKAGE FILLING MACHINE.
(Application filed Mar. 11, 1898.)

(No Model.) 10 Sheets—Sheet 10.

Witnesses:
Robert Wallace.
Oscar F. Hill.

Inventor:
George W. Watson
by W. A. Copeland
Atty

UNITED STATES PATENT OFFICE.

GEORGE W. WATSON, OF BOSTON, MASSACHUSETTS, ASSIGNOR TO THE ELECTRIC SCALE COMPANY, OF KITTERY, MAINE.

WEIGHING AND PACKAGE-FILLING MACHINE.

SPECIFICATION forming part of Letters Patent No. 633,675, dated September 26, 1899.

Application filed March 11, 1898. Serial No. 673,544. (No model.)

*To all whom it may concern:*

Be it known that I, GEORGE W. WATSON, a citizen of the United States, and a resident of Boston, in the county of Suffolk and State of Massachusetts, have invented certain new and useful Improvements in Weighing and Package-Filling Machines, of which the following, taken in connection with the accompanying drawings, is a specification.

My invention relates to improvements in weighing and package-filling machines, one object of my invention being to combine with two hoppers mechanism to carry packages successively beneath both hoppers and to have a package underneath each hopper at the same time and mechanism to close the flow from the first hopper independently of the weight or quantity of goods in the package, while the second one is closed by the weight.

Another feature of my invention relates to the contact mechanism in an electrically-operated machine in which a main and a supplemental contact are employed, the main contact being closed by mechanism actuated by the scale-beam and opened by mechanism actuated by the closing of the contact and the supplemental contact being actuated by separate mechanism which is set in operation after the main contact is made to both close and open the contact, the main contact being opened before the supplemental contact is opened.

Another feature relates to the valve-closing mechanism of the first hopper.

The several features of the invention will be fully described in the specification, and particularly pointed out in the claims at the end thereof.

The machine illustrated in the drawings as embodying my invention is of the class in which the mechanism for actuating the valve is operated by a double solenoid, although some of the features of my invention are adapted for use in weighing-machines in which the valve is operated by other means than electricity—as, for instance, a pneumatic machine.

Figure 2:
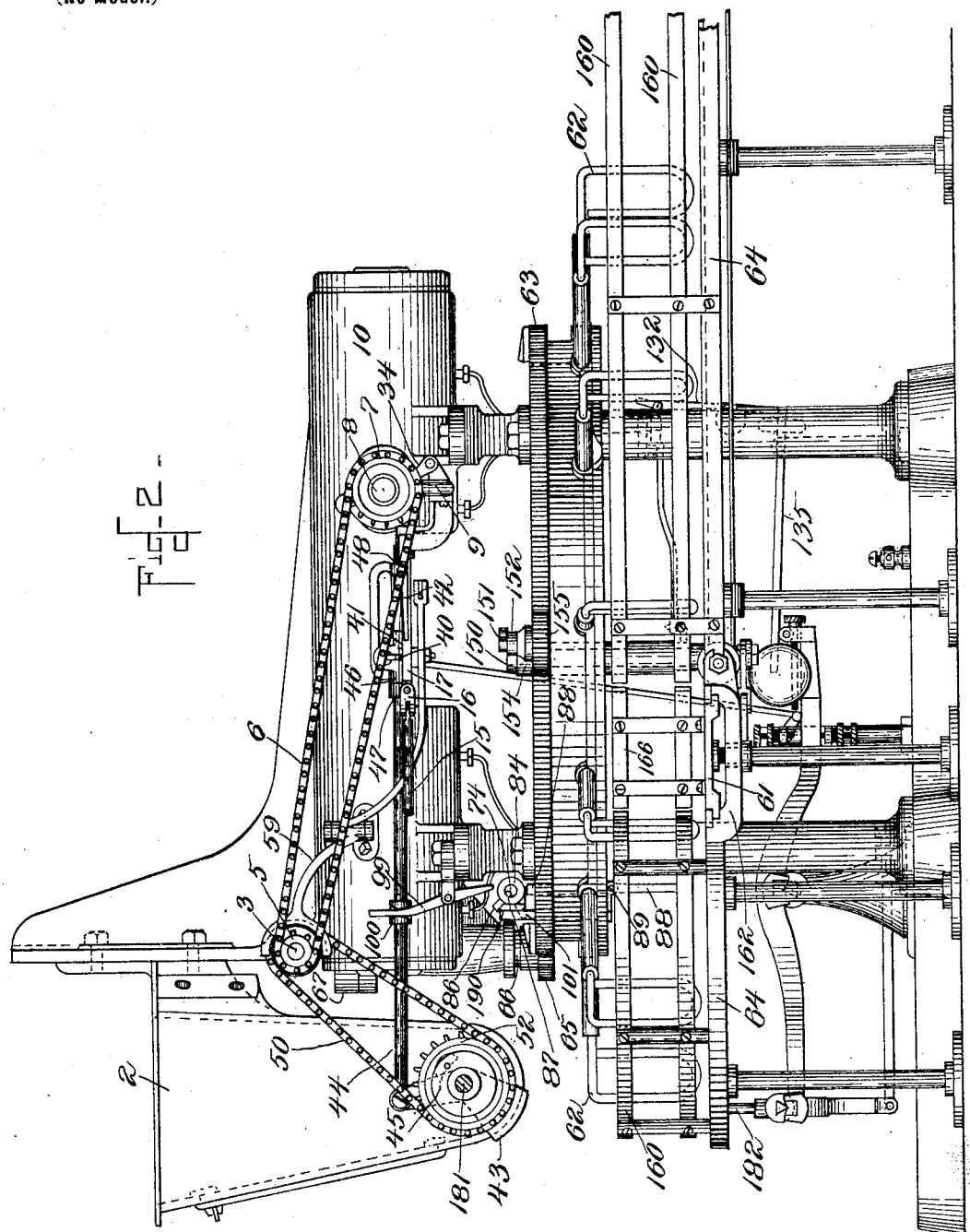
Figure 3:
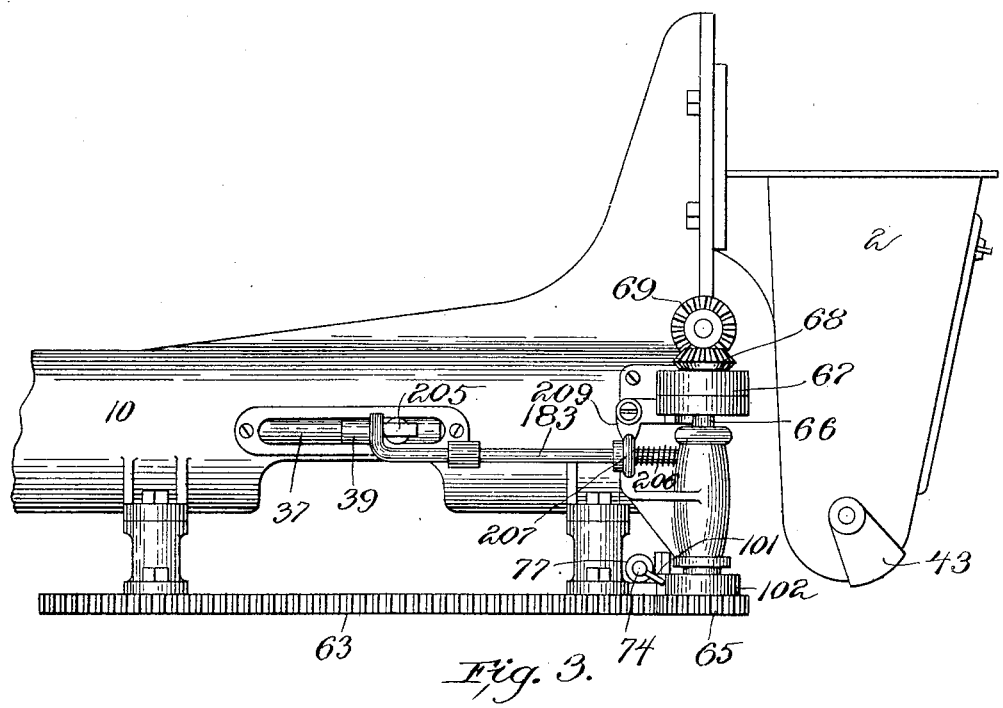
Figure 18:
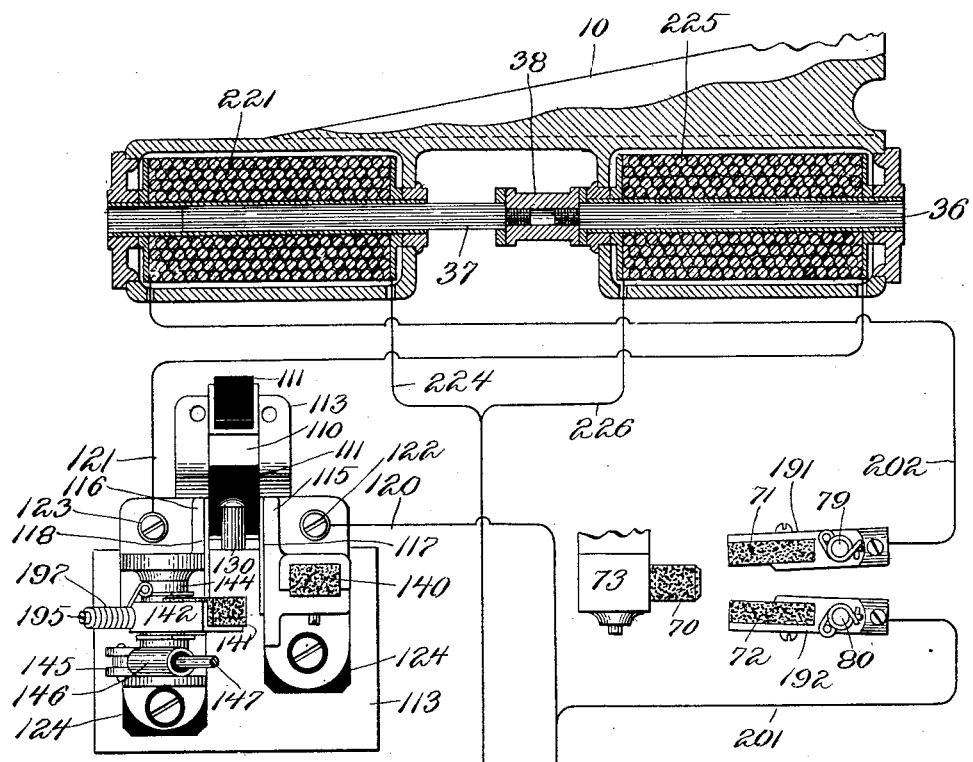

In the drawings, Figure 1 is a perspective of a machine embodying my invention. Fig. 2 is a right-hand side elevation, the first hopper being removed. Fig. 3 is a left-hand side elevation of a portion of the machine. Fig. 4 is a plan. Fig. 5 is a plan, partly broken away, showing the sliding carriage in its outermost position with a package thereon and other packages in line. Fig. 6 is a plan showing the carriage moved forward and the package partially removed. Fig. 7 is a plan of the ring and the lower parts of the machine, the hopper and solenoid and all other parts above the ring being removed, the parts being in position of rest. Fig. 8 is a vertical section on line 8 8 of Fig. 7, partly in section. Fig. 9 is an enlarged right-hand end elevation of a part of Fig. 2, showing the sprocket and a side elevation of the driving-shaft. Fig. 10 is a detailed sectional elevation on line 10 10 of Fig. 9, showing the valve-closing mechanism when the valves are closed. Fig. 11 is a section on line 10 10 of Fig. 9, showing the valve-closing mechanism when the valves are open. Fig. 12 is a detail plan of the forward or valve-opening contact. Fig. 13 is a section on line 13 13 of Fig. 12. Fig. 14 is a front elevation of the rear or valve-closing contact. Fig. 15 is a rear elevation of Fig. 14. Fig. 16 is a left-side elevation of Fig. 14. Fig. 17 is a detail of the cam operated by the gear-ring finger and the pin operatively connected therewith to open the main rear contact, the full lines showing the cam and pin when the contact is broken and the dotted lines showing when the circuit is closed. Fig. 18 is a diagram, partly in section, showing the solenoid, dynamo, and circuit with both sets of contacts.

1 is the first hopper, through which the package is partially filled, and 2 the second hopper, through which goods are fed to top off. 3 is the main driving-shaft, operated by belt-pulley 4. On the opposite end of the driving-shaft 3 from the pulley is a sprocket-wheel 5, connected by a chain 6 with the sprocket-wheel 7 on the short shaft 8, supported by a bracket 9, attached to the frame 10.

The hopper 1 has a swinging valve 11, pivoted at 12 and having a lever 13, connected by a link 14 with rod 15, which is operated by shaft 8 through intermediate mechanism to open and close at certain intervals, as will be particularly described. Said rod 15 is connected by link 16 with slide-rod 17, which slides in fixed sleeve 18. Said rod is partly cut away toward the rear end, forming a shoulder 25. At its rear end slide-rod 17 has a pin 19, which enters a longitudinal slot 20 in the arm 21 of rock-shaft 22. Fixed to a short shaft 23, passing loosely through sleeve 31, is an arm 24, which extends down into the path of the shoulder 25 on the slide-rod 17 and engages therewith. Projecting from the arm 24 is a stud 26. Mounted loosely on the shaft 8 is a disk which is preferably formed of two disks 27 28, clamped together by screw 29, so as to be adjusted with relation to each other for a purpose to be described later. Projecting from the face of disk 27 is a stud 30. (See Fig. 9.) Fixed to the shaft 8 is ratchet-wheel 32, with which a spring-pivoted pawl 33 engages, causing the disks 27 and 28 to rotate. When the disk 27 is rotated, the stud 30 engages with the stud 26 and causes the arm 24 to rock forward, engaging with the shoulder 25 on the slide-rod 17, causing it to slide forward, and thereby operating the connecting-rod 15 and closing the valve of hopper 1. The arm 24 from which stud 26 projects is hung a little forward of a vertical line passing through the axis of the disk 27, and the center of stud 30 when at its highest position is a little lower than the center of stud 26, so that when the arm 24 is swung forward a short distance the stud 30 will ride under stud 26, thus limiting the extent of forward movement of the slide-rod 17. On rock-shaft 22 is a dog 34, which engages the heel of pawl 33 after the stud 30 has passed under stud 26 and trips the pawl from the ratchet, so that the disks 27 and 28 remain stationary, and the ratchet continues to revolve with its shaft until the dog 34 is turned out of engagement with the pawl. This disengagement is effected by the rocking backward of shaft 22, which occurs when the slide-rod 17 is reciprocated backward, as will be described hereinafter. When the dog 34 is released, the spring 35 will throw the toe of the pawl again into engagement with the ratchet and cause the disks to rotate again, bringing the studs 30 and 26 into engagement with each other and sliding the rod 17 forward again. The backward reciprocation of the slide-rod is produced by connections with the core of the solenoids and opens the valve. The length of time that it remains open will depend upon the time that it takes for the stud 30 to come around into engagement with stud 26. It is obvious that by varying the relative position of the pawl 33 on disk 28 to stud 30 on disk 27 the length of rotation of the disk after dog 34 is released from the pawl before stud 30 will engage with stud 26 to close the valve of hopper 1 will also be varied, and therefore the quantity of goods which flow through will be varied. It is necessary that it should be regulated so as to close at least as soon as the valve of the second or topping-out hopper closes.

The two cores 36 37 of the solenoids are connected by a union 38, which has a cross-head 39. Pivoted to this cross-head is a dog 40, which, when the cores 36 37 of the solenoids are in their forward position and the valves are closed, rests in front of the feather 41, which projects up from the slide-rod 17. The dog 40 also rests upon the cam 42, which is fast to the sleeve 18. When the cores of the solenoids move toward the rear, the dog 40 engages with the blunt end of feather 41 and slides back the rod 17 and connecting-rod 15, thus opening the valve of hopper 1. As the cores approach the rearmost position the dog 40 rides up on the inclined face of the cam 42 and is raised from front of the feather, so that the backward movement of the slide-rod is stopped. When the cores move forward again, the dog 40 rides forward over the cam, being kept down by a spring 208, (see Figs. 10 and 11,) so that when it reaches a position forward of the feather 41 it will be down ready for engagement again with the feather at the next backward movement.

The valve 43 of the topping-out hopper 2 has an arm 45, pivoted at 181 and is operated by a rod 44, pivoted at its forward end to said arm 45. Said rod 44 passes through sleeve 46, hung from cross-head 39, and has collars 47 48, against which said sleeve 46 strikes to push the said rod back and forth as the cores of the solenoids reciprocate, thus opening and closing the valve of hopper 2. The comb-shaft 49, which drives the comb 50 of the hopper 2, is driven by connection with the main driving-shaft 3. The connection shown consists of a chain 51, running on sprockets 52 and 53, respectively, on said shafts. The comb-shaft 54 of hopper 1 is connected with hub of disk 55, which is loose on shaft 49 and has a pawl 56, which engages with ratchet 57, fixed to sprocket 52, so as to give motion to the shaft 54. When pawl 56 comes around to pin 58, which projects from the arm of valve 11 of hopper 1, it is thrown out of engagement with the ratchet, and the comb-shaft 54 then comes to a rest until the pin 58 is retracted by the opening of the valve of hopper 1.

59 is the shipping-lever, to set in motion and stop the comb-shaft, as described in previous patents.

The packages are placed on a traveling belt 60, which delivers them one at a time to a sliding carriage 61. The carriage then moves to a position where the package is engaged by the carrier-fingers 62, projecting from the intermittently-revolving gear-ring 63 and pushed along the segmental track 64 to position under the hoppers, as will be hereinafter described. When a package is removed from beneath hopper 1 to the scales 182 beneath hopper 2, another empty package will at the same time come into position beneath hopper 1. The carrier-ring 63 gears with pinion 65 on the vertical shaft 66. Said shaft 66 is operatively connected with the main shaft 3 by clutch 67 and bevel-gears 68 69. (See Figs. 2, 3, and 4.) At each rotation of the clutch and of the vertical shaft 66 the clutch becomes disengaged and the said shaft 66 and pinion 65 are brought to a rest and gear-ring 63 is also brought to a rest, thus giving to the ring 63 a rotation through an arc whose length depends upon the size of pinion 65. The clutch remains disengaged until again made operative by mechanism operated by the core of the solenoid when the latter moves in a direction to close the valve. This is accomplished through pivoted lever 209, which is engaged by a boss 207 on slide-rod 183, said slide-rod being engaged by pawl 205 on crosshead 39 and pushed forward as the solenoid moves to close the valve. In the drawings the slide-rod is shown in its retracted position behind the pawl. Mechanism for intermittently rotating the large ring, as above referred to, is fully shown and described in an application filed by me on June 30, 1897, Serial No. 642,298.

When the rear solenoid is energized, the movement of the solenoid actuates mechanism which opens the valves of both hoppers, and when the forward solenoid is energized mechanism is actuated to close the valve of the hopper above the scales, the valve of the first hopper being closed mechanically by other mechanism independently of the solenoid. The contact mechanism for the rear solenoid is that shown at the front of the machine, and the contact mechanism for the forward solenoid is located at the rear part of the machine. The valve-opening contact is actuated by the packages, it being necessary in the form of construction which I have shown to have packages come under both hoppers before the valves will open. The valve-closing contact of the second hopper is actuated by the tipping of the scale-beam.

I will now describe the contacts and their actuating devices more particularly, taking first the forward or valve-opening contact. (See Figs. 7, 8, 12, and 13.) The contact mechanism consists of a sliding contact-piece 70, which when it slides forward passes between and contacts with the jaws 71 72, which form the two terminals of the circuit. The sliding contact-piece 70 is mounted in a holder 73, which is secured to the slide-rod 74 by clamps 75, the holder being insulated therefrom by insulators 76. The rod 74 slides in the sleeve 77, which is slotted in the under side to allow play of the contact-holder 73 and clamps 75. In Fig. 7 the sleeve 77 is shown partly broken away on its upper side. Said sleeve is secured to the insulated base 190, which is secured to the frame of the machine. The slide-rod is normally held by a spring 78 in a position to keep the contact open, as shown in Fig. 12. The terminal jaws 71 72, to which lead the wires 201 202, are mounted in holders 191 192 on insulated pivots 79 80, having torsion-springs 81 82, which tend to draw them together; but the jaws are kept separated by the block 83 of non-conducting material. When the rod 74 slides in a direction to make the contact, the beveled end of contact-piece 70 will enter between the jaws, which will yield slightly, their springs, however, keeping the contact unbroken. A collar 84 fits loosely over the rod 74, being prevented from endwise movement by a clamp 85. It is keyed to the slide-rod by a pin 86, which enters a spline 87 in the rod. An end view of the rod is shown in Fig. 2. The pin does not interfere with the endwise reciprocation of the rod, although the collar has no endwise movement. When the collar is rotated, it causes the rod also to rotate. A lever 88 is fulcrumed at 89. (See Figs. 8 and 12.) Its upper end enters a hole 90 in the collar 84, with which it has a sort of rolling fit, so that when the lever 88 is turned on its fulcrum it will cause the rod 74 to roll. The lower end of said lever 88 is connected to a link 91, which at its other end (see Fig. 7) is connected to the arm 92 of the double lever 92 93, the two arms of the lever being hinged together at 94 and the arm 93 being pivoted at 95. It will be seen that the arm 93 is curved substantially to conform to the curve of the inner edge of the track and that the arm 92 has a portion 96 near its end which protrudes over the track. It will be plain that if a package 97 passes along the track and crowds against the protruding portion 96, pushing it out of the path, and if there is no package or other pressure against the arm 93 to prevent it from moving inward the outer end of link 91, which is free to swing horizontally in an arc of a circle with its other end as a center, will swing around and the double lever will bend at its hinge 94, pushing it over the track, as shown in dotted lines in Fig. 7. If, however, there is also a package on the track bearing against arm 93, when the package 97 passes part 96 the lever cannot be bent at the hinge, and the link 91, instead of swinging in an arc, will be pushed endwise away from the track. This endwise movement of link 91 will turn rod 88 on its fulcrum and give to collar 84 and slide-rod 74 a rolling movement. Fulcrumed in bracket 98 is a lever 99, (see Fig. 2,) whose upper end engages with a grooved collar 100, fixed on slide-rod 44, so that when the slide-rod 44 moves back and forth with the movement of the solenoids the lever 99 will be turned on its fulcrum. The pin 86, which keys the collar 84 to rod 74, projects upward into a position in front of the lower end of lever 99 when the rod 74 is pushed in to make the valve-opening contact. Projecting from the slide-rod 74 at or near its other end, but in a different plane from pin 86, is pin 101. (See Fig. 7.) Carried on the vertical shaft 66 near its lower end is a cam 102, having a point 103, which at each revolution of the shaft engages with the pin 101 if the slide-rod 74 be rolled, as already described, when packages are beneath both hoppers.

The operation is as follows: The valves being closed and contacts open, the power is put on and ring 63 revolved until packages reach both hoppers. When the second package arrives against arm 93 and the first package passes the projecting portion 96 of the double lever, lever 88 is actuated through rod 91, as already described, to roll rod 74 until pin 101 turns up into path of cam 102, so that when cam-point 103 comes around it will engage with said pin 101 and pull slide-rod 74 until contact-piece 70 enters jaws 71 72, making the valve-opening contact. As soon as this is done the solenoid will be energized and move in a direction to open the valves. When the slide-rod 74 is rolled up to bring pin 101 into engagement with cam-point 103, it also brings pin 86 up in front of the line of movement of lever 99, and when the rod 44 moves to the rearward to open the valve it turns lever 99 on its fulcrum, as already described. The lower end of said lever is thereby pushed against pin 86 and turns rod 74, so as to trip pin 101 from engagement with cam 102, and the spring 78 throws slide-rod 74 back to its normal position, thus opening the circuit.

The valve-closing contact mechanism is located at the rear part of the machine and consists of a double contact, one of which is broken in advance of the other, each contact mechanism being operated independently of the other, the supplemental contact being for the purpose of relieving the sparking of the main contact. The main contact is preferably metallic, and the supplemental-contact carbon, which is cheaper, can be easily replaced when worn out. (See Figs. 7, 8, and 14 to 17.) The main-contact piece 110 is mounted on an insulated lever 111, pivoted on pivot 112 in the bracket 113, secured to the fixed ring 114, and contacts with the two terminals 115 and 116. In order to insure a contact, the terminals are provided with springs 117 118, between which the contact-piece 110 fits. The torsion-spring 119 around pivot 112 tends to keep the contact closed. Wires 120 and 121, connected with the two poles of the forward solenoid, are connected with the terminals 115 and 116, respectively, by the binding-screws 122 123. The terminals 115 and 116 are insulated from the bracket 113 by insulation 124. Mounted loosely in sleeve 125, projecting from bracket 113, is a shaft 126, carrying cam 127, which extends into the path of the package-moving fingers 62, so that when one of said fingers rides over the cam the cam-shaft will be partially rotated. Projecting from the said cam-shaft is a pin 128, which engages in a slot 129 in the pin 130, which passes loosely through a vertical hole in the horizontal arm of bracket 113 and directly beneath the contact-lever 111. When one of the fingers 62 rides over the cam 127, it depresses it, as shown in Fig. 17, and the cam-shaft 126 is rolled, and the pin 128 raises pin 130, which in turn lifts contact-lever 111 and breaks the main contact. Pivoted at 131 is a lever 132, whose upper end rests against the flat side of the thin lower part 196 of pin 130 when said pin is in its lowermost position, and said lever is thereby prevented from hanging plumb. As soon as pin 130 is raised out of the way lever 132 swings into plumb or as nearly so as permitted by the stop-pin 133, so as to bring the upper end of said lever under the end 196 of said pin 130 and hold it up. The counterweight 134 quickens the action of lever 132. The engagement of the lever 132 with pin 130 is so delicate, however, that the tension of spring 119, which tends to throw down the pin 130, will trip the lever unless the latter is held in some way. This is done by the lower end of lever 132 bearing against the rear end 136 of the auxiliary scale-beam 135 when the scales are in their normal position. As soon as the scale-beam is tipped by a weighted package the lever 132 is tripped and the contact-lever drops, making the circuit through the forward solenoid and closing the valve of hopper 2, the valve of hopper 1 being closed by other means already described.

The supplemental contact device consists of a fixed contact-piece 140 in electrical connection with the terminal 115 (see Figs. 7 and 14) and a swinging contact-piece 141 in electrical connection with terminal 116 and mechanically operated by mechanism actuated by the moving gear-ring. (See Figs. 7, 8, 12, and 16.) These supplemental contacts are preferably carbon. The movable contact 141 is in a holder 142, which is pivoted by pin 195 to a hub 144, which swings horizontally on pivot 143, the movable contact-piece making a grazing contact with fixed contact-piece 140 when it is closed. A spring 197 around pivot 195 makes the contact between 140 and 141 elastic. Projecting from the hub 144 of said holder 142 is an arm 145, to which is pivoted a nipple 146, with which is connected rod 147. The other end of connecting-rod 147 is pivoted to a vertical rock-shaft 148 at 149. The movable contact 141 is insulated from the shaft 148, preferably by an insulating-bushing, to the nipple 146. Said rock-shaft 148 is mounted in a sleeve 154, secured to a bracket 153, which is fastened to the fixed ring 114. (See Figs. 7 and 8.) On the upper end of shaft 148 is a rocker-arm 150, pivoted to one end of a pitman 151, which at its other end is pivoted to a crank 152. (See Figs. 1, 2, and 4 to 7.) Said crank 152 is on the upper end of a short vertical shaft which turns in bearings in the bracket 153 and which has on its other end pinion 155, which meshes with the large gear-ring 63. Said pinion has just teeth enough to make one revolution while the large ring moves through an arc equal to the distance between the package-moving fingers. At each revolution of said pinion the crank 152 makes a revolution, giving to the rocker-arm 150 and rock-shaft 148 a rocking movement which reciprocates the connecting-rod 147, and thereby rocks the movable contact-holder 142, giving to it a swinging movement and causing it to close and open at each revolution of the pinion 155, and thereby making and breaking contact at each revolution. As we have already seen, the main valve-closing contact is actuated by the tipping of the scale-beam under a full load. This energizes the rear or valve-closing solenoid so that it moves forward and actuates the mechanism which sets the large gear-ring in motion. When the large ring begins to move, it rotates pinion 155, thus actuating the supplemental contact, which therefore does not make its contact until after the main contact is made. When the large ring has moved far enough for one of the package-moving fingers to engage with cam 127, it begins to lift the main contact; but said contact does not break until after the supplemental contact is made. The supplemental contact begins to withdraw after the pinion has made a half-revolution, but does not break entirely until after the main contact is broken. About the time a package reaches the scale-pan under the second hopper and another package is under the first hopper the valve-opening contact will be made, as previously described.

There are guide-rails 160 at each side of the track 64 and of the belt 60. It will be observed that the carrier-belt is not directly in line with the track. A sliding carriage 61 slides in ways 162 transversely to the carrier and the track. (See Figs. 2, 4, 5, and 6.) The packages are fed from the carrier-belt directly onto the said carriage when the carriage is in its outer position, as in Fig. 5. The carriage holds but one package at a time. A connecting-rod 163 is pivoted at one end to said carriage and at its other end is pivoted to an arm 164, projecting from rock-shaft 148. While the said rock-shaft turns at the first half of its period of movement to make the supplemental contact, it draws forward connecting-rod 163 and carriage 61, and the package which is on the carriage is brought in front of the package-moving finger next in turn. As the ring turns the finger engages with said package and pushes it from the carriage onto the track, as in Fig. 6. The carriage retracts during the last half of the period and comes back into its first position. Rising from the carriage is a guard 165, which when the carriage moves forward bars the passage from the carrier-belt, so that no other package can be delivered until the carriage returns. It also has an end rail 166.

Pivoted to the side of the fixed ring 114 is a spring-latch 170, extending up into the path of the package-moving fingers 62. The latch allows the fingers to freely pass over it in a forward direction, but prevents backward movement.

The hoppers are not necessarily located as near together as shown in the drawings. They may be located at any angle apart.

In Fig. 18 is shown diagrammatically the electrical connections between the solenoids, dynamo, and contacts. The circuit is made from one pole of the dynamo 220 to one pole of the rear or valve-opening solenoid 221 through wire 222, branch 201, forward contact mechanism, which has already been fully described, and wire 202. The circuit from the opposite pole of the dynamo to the other pole of the rear solenoid 221 is through wire 223 and branch 224. The circuit from the first pole of the dynamo to one pole of the forward or valve-closing solenoid 225 is made through wire 222, branch 120, the rear contact mechanism already described, and wire 121. The circuit from the other pole of the dynamo to the other pole of the forward solenoid 225 is through wire 223 and branch 226. Both contacts are shown open.

What I claim as my invention is—

1. In a weighing and package-filling machine, the combination with two hoppers or feed-chutes, of package-carrying mechanism whereby the packages are successively carried to a position to receive goods from each source of supply, mechanism which can be variably adjusted to cut off the flow of goods after predetermined periods of time of varying duration, mechanism which then carries the package to a position to receive goods from the second source, mechanism which opens the flow of goods from the second source and mechanism which cuts off the flow when the package contains a predetermined quantity, substantially as described.

2. In a package-filling machine, the combination of two feed-chutes which discharge successively into the same package and which discharge simultaneously into different packages, means which cut off the flow from one chute after a predetermined period of time, and a cut-off for the second chute controlled by the weight of the filled package, substantially as described.

3. In a weighing and package-filling machine, the combination of two hoppers or feed-chutes, a valve for each hopper or chute, mechanism which carries each package first to a position to be partially filled from one of said hoppers or chutes and thence to a position to receive additional goods through the other hopper or chute, mechanism which opens the valves controlling the flow from both hoppers or chutes, said valve-opening mechanism being actuated by engagement with packages in position under both hoppers or chutes at the same time and being inoperative to open either valve unless both packages are in position, substantially as described.

4. In a weighing and package-filling machine, a hopper or feed-chute, a valve for the hopper or chute, an actuating-rod connected therewith, a pivoted lever which engages with said rod, a rotary shaft, a disk mounted on a sleeve which is loose on said shaft, a ratchet fast on said shaft and a pawl on said disk which engages with the ratchet and causes the disk to rotate with the shaft, a pin on said disk which if the valve is open, engages with a projection on said pivoted lever and causes it to turn on its pivot and actuate the operating-rod to close the valve, substantially as described.

5. In combination with a hopper or feed-chute, a valve therefor, an actuating-rod connected with said valve, a pivoted lever which engages with said rod, a rotary shaft, a disk mounted on a sleeve which is loose on said shaft, a ratchet-and-pawl connection between the disk and shaft which when in engagement causes the disk to rotate with the shaft, a pin on said disk which engages with a projection on said pivoted lever and thereby actuates the mechanism to close the valve, a tripping device which trips the pawl and holds it disengaged after the valve is closed so that the disk ceases to revolve, mechanism for opening the valve and mechanism which when the valve opens removes the tripping device from engagement with the pawl and the disk is again rotated, substantially as described.

6. In combination with a hopper and its valve, a slide-rod connected with said valve, a reciprocating member which engages with said slide-rod and moves it in a direction to open the valve, a disk which when the valve is opened is caused to rotate and during its rotation actuates the valve-rod to close the valve, substantially as described.

7. In combination with a hopper and its valve, a slide-rod connected with said valve, mechanism which opens said valve, an intermittently-rotating member which at each rotation thereof actuates the slide-rod to close said valve, and means for adjusting said rotary member so that the valve will remain open during a predetermined fractional portion of a revolution of said rotary member, substantially as described.

8. In a package-filling machine, in combination with an intermittently-rotating package-moving ring, a track along which the packages are intermittently moved by said ring, a sliding carriage, means for intermittently depositing empty packages on said carriage, mechanism connecting said carriage and said ring whereby the ring imparts an intermittent movement to the sliding carriage and causes it to move the packages to a position where they are taken by the package-moving ring as fast as the filled packages are removed, substantially as described.

9. In combination with an intermittently-rotating ring, package-moving fingers projecting therefrom, a continuously-traveling package-carrier, a stationary track, a sliding carriage located between said carrier and said track, the packages being fed from the carrier onto the carriage, mechanism connecting said carriage and said ring whereby at each period of movement of said ring the carriage will move forward into position where one of the said fingers will transfer the package from the carriage onto the said track, and the carriage will then be moved back again, and means for preventing the delivery of packages from the carrier to the carriage while in its forward position, substantially as described.

10. In a weighing and package-filling machine in which the valve which controls the flow of goods is actuated by a solenoid, a sliding contact-piece which makes and breaks the circuit, a slide-rod which has a longitudinal movement to actuate the contact-piece and which is also capable of turning on its axis, a spring which normally holds said contact-piece out of circuit, a rotary cam which engages with said slide-rod and causes the contact-piece to close the circuit, the solenoid thereby being energized, and a lever actuated by the sliding core of the solenoid to turn said slide-rod on its axis and disengage it from the cam, whereby its spring retracts said rod and breaks the circuit, substantially as described.

11. In an electric weighing and package-filling machine, a double contact mechanism, consisting of a main contact and a supplemental contact the main contact being made by the tipping of the scales, the supplemental contact being made by mechanism set in operation by the closing of the main contact mechanism which breaks the main contact, after the supplemental contact is made, and independent but coöperating mechanism which breaks the supplemental contact after the main contact is broken, substantially as described.

12. In an electric weighing and package-filling machine, an intermittently-rotating ring, a double contact mechanism in the valve-closing circuit, consisting of a main contact and a supplemental contact mechanism actuated by the tipping of the scales which makes the main contact, mechanism which causes the said ring to rotate after the main contact is made, mechanism actuated by said ring after it begins to move to make and break the supplemental contact, and other mechanism actuated by the moving ring to break the main contact after the supplemental contact is made, and before the supplemental contact is broken, substantially as described.

13. In an electric weighing and package-filling machine, an intermittently-rotating ring, a double contact mechanism consisting of a main contact and a supplemental contact in the valve-closing circuit, a pivoted lever on which the main contact is mounted, a spring which throws said lever to make the contact, a pivoted trip-lever engaged by the scale-beam, a lifting-pin engaged by said trip-lever which engages with said main contact-lever and holds the contact broken, and which is tripped by the tipping of the scales whereby said spring throws the contact-lever, mechanism which sets the said ring in motion when the contact is made, a cam-lever which is actuated by the moving ring and lifts the contact-lever through said lifting-pin, the trip-lever again being engaged by the scale-beam, a pinion gearing with said intermittently-rotating ring, and intermediate mechanism whereby the rotation of the pinion causes the supplemental contact to be made after the main contact is made, and then breaks it after the main contact is broken, substantially as described.

14. In a weighing and package-filling machine, the combination of two feed-chutes, a valve for each feed-chute, mechanism which opens both valves, said valve-opening mechanism including therein a jointed lever, the two members of said lever engaging respectively with packages when in position under both feed-chutes, said mechanism being operative to open the valves only in combination with packages so positioned under both chutes simultaneously, substantially as described.

15. In a package-filling machine, the combination with a hopper or feed-chute, of mechanism which closes the outlet of the hopper or feed-chute after it has remained open a predetermined duration independently of the weight or quantity of goods and means for adjustably varying the duration, substantially as described.

16. In a weighing and package-filling machine, the combination of two hoppers, mechanism which carries the packages first to a position where one hopper discharges directly into the packages and partially fills the same, mechanism which closes the outlet from the first hopper after a predetermined open period irrespective of the weight or quantity of goods, mechanism which then transfers the packages to the scales, mechanism which then opens the flow from the second hopper directly into the packages while on the scales and mechanism which is actuated by the tipping of the scales to cut off the flow, substantially as described.

17. In a weighing and package-filling machine, the combination of two hoppers, mechanism which carries the package first to a position where one hopper discharges directly into the package, mechanism which cuts off the flow from the first hopper when the package is partially filled, mechanism which then transfers the package to the scales, mechanism which opens the flow from the second hopper directly into the package while on the scales, and mechanism which is actuated by the tipping of the scales to cut off the flow, substantially as described.

In testimony whereof I affix my signature in presence of two witnesses.

GEORGE W. WATSON.

Witnesses:
WILLIAM A. COPELAND,
OSCAR F. HILL.